US 8,033,087 B2

(12) United States Patent
Rapila et al.

(10) Patent No.: US 8,033,087 B2
(45) Date of Patent: Oct. 11, 2011

(54) APPARATUS FOR PICKING MUSHROOMS

(75) Inventors: Timo Rapila, Honkajoki (FI); Juhana Kantola, Kangasala (FI); Tero Rapila, Otalampi (FI)

(73) Assignee: Green Automation Ltd Oy, Kiukainen (FI)

( * ) Notice: Subject to any disclaimer, the term of this patent is extended or adjusted under 35 U.S.C. 154(b) by 266 days.

(21) Appl. No.: 11/920,917

(22) PCT Filed: Apr. 21, 2006

(86) PCT No.: PCT/FI2006/050160
§ 371 (c)(1),
(2), (4) Date: Sep. 1, 2009

(87) PCT Pub. No.: WO2006/111619
PCT Pub. Date: Oct. 26, 2006

(65) Prior Publication Data
US 2009/0320430 A1    Dec. 31, 2009

(30) Foreign Application Priority Data

Apr. 22, 2005    (FI) ..................................... 20055187

(51) Int. Cl.
*A01D 45/00*    (2006.01)
(52) U.S. Cl. ....................................... 56/327.1; 56/13.1
(58) Field of Classification Search .................... 56/327, 56/1, 328.1, 10.2 E, 13.1, 12.9
See application file for complete search history.

(56) References Cited

U.S. PATENT DOCUMENTS

| | | | | |
|---|---|---|---|---|
| 3,635,005 A | * | 1/1972 | Persson | 56/327.1 |
| 3,925,973 A | * | 12/1975 | Glover | 56/328.1 |
| 4,425,751 A | | 1/1984 | Bousseau et al. | |
| 4,472,929 A | * | 9/1984 | MacCanna et al. | 56/327.1 |
| 4,532,757 A | * | 8/1985 | Tutle | 56/328.1 |
| 4,545,186 A | * | 10/1985 | MacCanna | 56/327.1 |
| 4,663,925 A | * | 5/1987 | Terada | 56/328.1 |
| 4,718,223 A | * | 1/1988 | Suzuki et al. | 56/328.1 |
| 4,843,561 A | | 6/1989 | Larson | |
| 4,873,644 A | * | 10/1989 | Fujii et al. | 700/219 |

(Continued)

FOREIGN PATENT DOCUMENTS

DE    202004009929 U1    9/2004

(Continued)

OTHER PUBLICATIONS

PCT/ISA/210—International Search Report—Jul. 28, 2006.

*Primary Examiner* — Thomas Will
*Assistant Examiner* — Mai Nguyen
(74) *Attorney, Agent, or Firm* — Venable LLP; Eric J. Franklin

(57) ABSTRACT

An apparatus for picking mushrooms including a carriage, at least one picking head arranged to move back and forth horizontally, and a suction pad apparatus configured to grip mushrooms for picking. A movable camera or scanner may be arranged to image an area in which the mushrooms grow. A first member may be coupled to the picking head and arranged to move back and forth horizontally for moving the suction pad apparatus horizontally. A controlled parallelogram mechanism may lift and lower the suction pad apparatus and couple the suction pad apparatus to the first member, and which may be arranged to maintain a position of the suction pad apparatus irrespective of a height on which the suction pad apparatus is positioned.

21 Claims, 5 Drawing Sheets

U.S. PATENT DOCUMENTS

| | | | |
|---|---|---|---|
| 4,975,016 A * | 12/1990 | Pellenc et al. | 414/501 |
| 5,058,368 A * | 10/1991 | Wheeler | 56/13.1 |
| 5,185,989 A * | 2/1993 | Russell et al. | 56/13.1 |
| 5,471,827 A | 12/1995 | Janssen et al. | |
| 5,544,474 A * | 8/1996 | Finkelstein | 56/10.2 A |
| 6,094,198 A | 7/2000 | Shashua | |

FOREIGN PATENT DOCUMENTS

| | | |
|---|---|---|
| EP | 0428284 A1 | 5/1991 |
| JP | 7087829 A | 4/1995 |
| NL | 6814542 A | 4/1970 |
| WO | WO-91/11902 A1 | 8/1991 |
| WO | WO-93/00793 A1 | 1/1993 |

\* cited by examiner

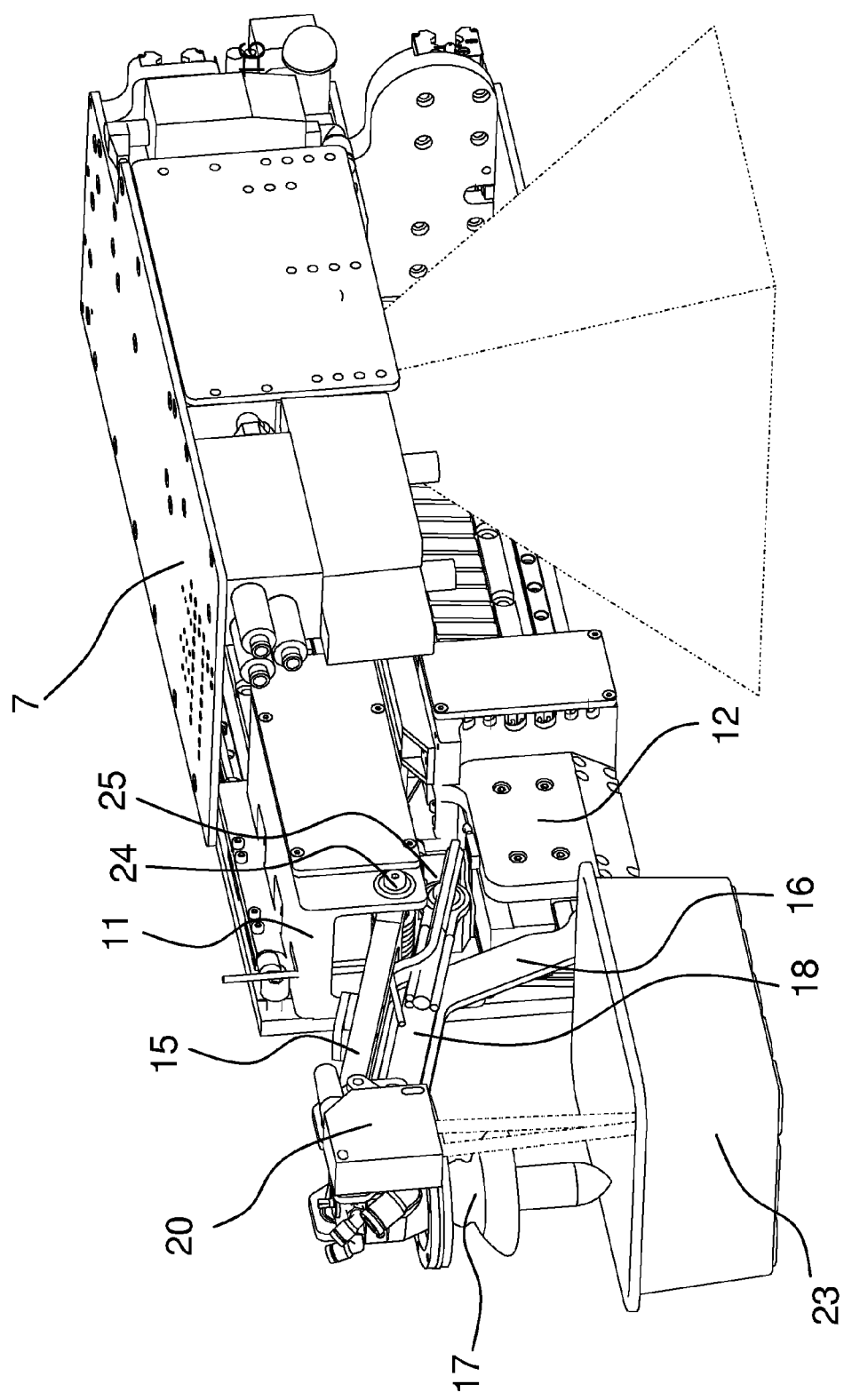

APPARATUS FOR PICKING MUSHROOMS

FIELD OF THE INVENTION

The invention relates to an apparatus for picking mushrooms.

BACKGROUND OF THE INVENTION

According to prior art champignon mushrooms are grown on a substrate consisting for example of compost treated in a suitable manner and supplemented with mycocelial filaments. The filaments are grown in suitable temperature and humidity, and it is supplied with additional nutrients, and the substrate is covered with a layer of peat, if necessary. Champignon mushrooms do not need light in order to grow. Champignon mushrooms that have grown sufficiently are picked and several harvests are obtained from the substrate. The growing methods are well known, and the picking is typically performed manually.

The substrate is typically placed on shelves, in which there are several superimposed layers, wherein the floor space is efficiently utilized. The shelves are typically dimensioned in such a manner that manual picking from the entire substrate is possible, wherein the shelves are long and narrow. The shelves form for example different kinds of boxes, in which the substrate is placed. The substrate is often uneven or it has a curved shape.

In prior art apparatuses have been developed for picking of mushrooms, which automatically detect the mushrooms, pick them up, cut the stem and transfer the mushroom either on a conveyor or in a collection vessel. One apparatus is disclosed in the document WO 91/11902, in which the apparatus comprises cameras and suction pads by means of which the mushrooms are transferred into containers. However, the transfer mechanism of the suction pads is complex, heavy and it occupies a great deal of space. It is necessary to arrange several cameras in the apparatus so that it would be possible to image the entire width of the substrate. When only one camera is used, the image thus formed is very distorted at its edge areas, wherein significant imprecision occurs in the determining the location of the mushroom, as the height of the mushrooms also varies. Because the substrate is typically positioned on low shelves, the camera must be positioned very low as well, which, in turn, reduces the area that can be scanned with the camera. The addition of cameras increases the costs and the size of the device.

One apparatus is disclosed in the document WO 93/00793, in which the apparatus comprises several cameras and a suction pad attached at the end of a moving arm, by means of which the mushrooms are picked up and dropped on a moving belt. The purpose of the cameras is to scan the substrate and determine the location of a mushroom. The drawback of said apparatus is, however, that it does not recognize the height at which the mushroom is located. In practice, the height or position of the mushroom in the vertical direction varies significantly. The apparatus lowers the moving arm always at the same height and the flexible structure of the suction pad grips the mushroom. As for the suction pad, it is not certain that the suction pad will grip a mushroom located at a distance and that this will take place sufficiently gently. The positioning of the suction pad accurately at the location of the mushroom also requires the movement of the carriage, wherein picking becomes slower.

Other apparatuses for picking of mushrooms have been disclosed in documents EP 0428284 and NL 6814542.

Document U.S. Pat. No. 4,425,751 discloses a picking apparatus and a camera by means of which it is possible to detect an asparagus for picking purposes. Document U.S. Pat. No. 4,843,561 discloses an apparatus by means of which fruit or vegetables can be picked by means of a camera.

SUMMARY OF THE INVENTION

The purpose of the present invention is to eliminate the drawbacks of prior art picking devices.

It is a special advantage of the apparatus according to an embodiment of the invention that its structure is low. Despite of the low structure, the mechanisms of the apparatus have been constructed in such a manner that sufficient paths of motion are attained so that the mushrooms can be picked up from varying heights and within a wide area and can also be taken to collection boxes. The mechanisms of the apparatus have been selected in such a manner that the mass to be moved would be as light as possible. Some of the parts of the apparatus have been provided with a number of different components and functions so that the apparatus becomes compact and it is possible to speed up the different stages of picking. The automatically functioning apparatus is suitable for such shelf structures which are in use at present, or only minor modifications are required, for example installation of driving rails, if they have not been installed already.

The mechanism by means of which the suction pad gripping the mushroom is transferred to the correct position is light in weight, and thus it is possible to attain sufficient speed of motion rapidly. The motions enabled by the mechanism are considerably more versatile than those of devices of prior art.

The apparatus according to a first embodiment of the invention comprises a scanner or a camera of a machine vision system, by means of which a mushroom and the position of the mushroom is identified. It is a special advantage of the system that the camera or scanner is arranged movable, wherein by means of only one camera or scanner it is possible to image the entire area from which mushrooms are picked. The image or scanning result obtained by means of the camera is not distorted, if the mushrooms in the edge areas are imaged directly from above. As a result of the possibility to transfer the camera or scanner, the interpretation of the machine vision system of the position of the mushroom in the XYZ system of coordinates is far more accurate than in prior art, because distortions are insignificant. In an embodiment the apparatus also utilizes a measuring device by means of which the Z-position of the mushroom is determined and verified.

In an embodiment of the invention the camera or scanner is attached to the picking head itself that performs the picking or to the same moving structure with the picking head. As a result, the imaging or scanning of the area from which picking takes place next can be combined with the different work stages of picking. There is a special advantage that separate actuators and members are not required to move the camera/scanner, wherein the length of the apparatus does not increase. At the same time the apparatus becomes compact especially when the camera or scanner or other device necessary is located as close as possible to the picking head. Because the camera/scanner and the picking head are located in the same moving structure, they do not hit each other. Preferably the camera/scanner and the suction pad performing the picking are positioned successively in the driving direction of the apparatus.

There are several alternatives to determine the location of the mushroom in the XYZ system of coordinates. In addition to the horizontal X and Y directions the camera/scanner and the machine vision system coupled thereto also determine the height of the mushroom in Z direction. Due to the movable camera/scanner, distortions are not produced, and the determination is more accurate. The suction pad can be positioned within a suitable distance above the mushroom, and thereafter the mushroom is gripped cautiously, wherein fewer damages occur. The structure of the suction pad becomes simpler, because a long, flexible structure is not required.

The height of the mushroom is verified by means of the machine vision system with the assistance of a separate measuring device, if desired, said measuring device being positioned for example in the picking head or close to the suction pad.

The suction pad and camera/scanner and, if desired, also the aforementioned measuring device are positioned in the same moving structure, wherein the apparatus becomes compact and several linear guides, motors or actuators are not required. This affects especially the length of the apparatus, wherein the structure becomes compact and easier to manipulate.

The mechanism in an apparatus according to a second embodiment of the invention for transfers of the suction pad is simple and its structure is low, because by means of horizontal synchronized movements of one or several actuators and by means of levers it is possible to produce both the lifting and lowering movements of the suction pad, as well as a sufficiently wide horizontal transfer movement. In an embodiment it is a parallelogram mechanism in particular that is applied. The number of the elements required is small, and thus the structure is light in weight, and it can also be provided with a camera/scanner, if desired. Especially linear servomotors have been used as actuators. It is a special advantage of the mechanism that by means of the same it is possible to swing the suction pad and combine the swinging motion with the rotating movement of the suction pad. By means of said movements the mushroom and its stem will be detached from the substrate.

One embodiment of the apparatus also comprises a camera by means of which the mushroom is imaged from the side, so that the cutting point in the stem of the mushroom could be optimized. The length and shape of the stem vary and there may be other mushrooms attached thereto, wherein the selection of the cutting point must be made on individual basis. The total weight and quality of the cut mushroom depend strongly on the selection of the cutting point.

The apparatus is especially suitable for picking of champignon mushrooms, but picking of other kinds of mushrooms is also possible, especially if the shape of the mushroom cap resembles the cap of a champignon mushroom.

BRIEF DESCRIPTION OF THE DRAWINGS

In the following, the invention will be described in more detail with reference to the appended drawings, in which FIG. 3 shows a detail of FIG. 2 and its position in a second work stage.

DETAILED DESCRIPTION OF EMBODIMENTS OF THE INVENTION

Figure 1:
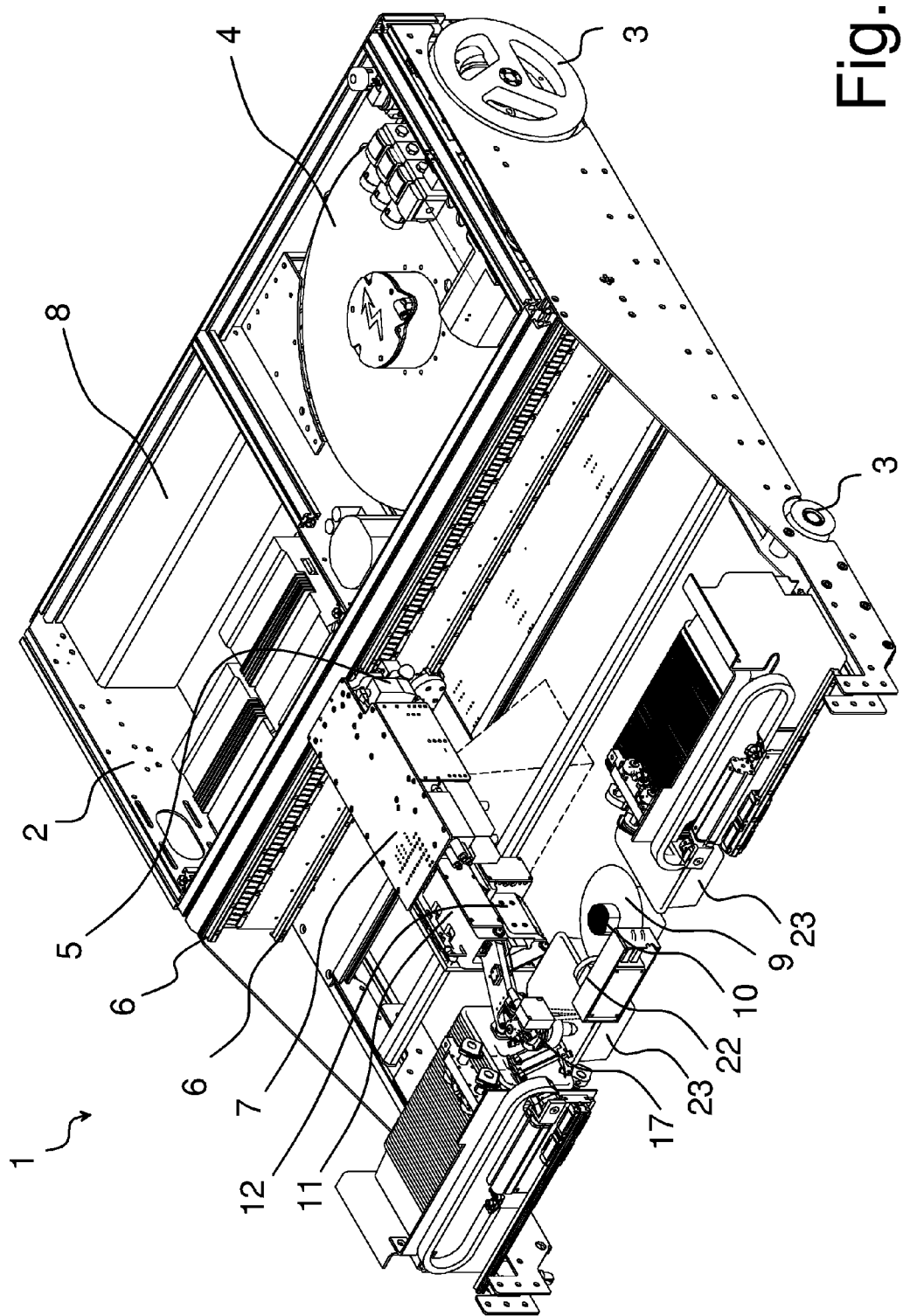
FIG. 1 shows a first embodiment of the apparatus.

Those parts of the apparatus that correspond to each other in structure or function in different figures are marked with the same reference numerals.

FIG. 1 shows an embodiment of the invention for an automatic apparatus for picking mushrooms. The apparatus 1 comprises a carriage 2 in which the necessary devices and mechanisms have been positioned. The carriage 2 comprises for example a frame composed of sheet metal and aluminium profiles, which is equipped for example with wheels 3 for moving purposes. By means of wheels 3 the carriage 2 is capable of moving back and forth in its driving direction, for example along rails installed on both sides of the area in which the mushrooms grow. The width of the area corresponds to the width of the carriage 2. The front part of the carriage 2 is provided with a reelable coil 4 for an electric cable and if necessary, also for a pneumatic hose and/or data transmission cables. The coil 4 is equipped with torque control. The coil 4 is not absolutely necessary. The carriage may be arranged to move back and forth in a multilevel shelf intended for growing mushrooms. The carriage may be transferred from one level to another.

In the driving direction, there is a housing 8 in the front part of the carriage 2, said housing being provided with the electric equipment, electronics, processors, data transmission equipment, control system and machine vision system required by the apparatus, as well as the control devices required by the suction pad apparatus. In this context, components of prior art known as such are applied, the selection and adaptation of said components in the use according to the invention being known as such by anyone skilled in the art on the basis of the description below, so that the actuators required by the apparatus 1 and their supply of energy and control, the movements of the actuators, sensing of the movements, different kinds of wirings and control system and its programming could be constructed suitable for the purpose of use and for automatic operation.

In the central part of the carriage 2 there is a linear servomotor 5 positioned transversely with respect to the driving direction and a linear guide/linear guides 6 by means of which the picking head 7 is capable of moving back and forth. The parts 5 and 6 are attached to the vertical wall of the carriage 2. The projecting picking head 7 is directed towards the back of the carriage 2. The carriage 2 may comprise two or several picking heads 7, which are located adjacently in the driving direction and attached to the linear guide 6. At the same time the moving picking head 7 forms a structure to which other devices are also attached.

At the back of the carriage 2 there is a round blade 9 that is preferably rotating and utilized for cutting the stem of the mushroom. The blade 9 is provided with a brush, by means of which the suction pad of the suction pad apparatus 17 is cleaned up and which rotates together with the blade 9. In the back of the carriage 2 there is also a place for boxes 23 in which the mushrooms are collected. The carriage also comprises a camera 22 by means of which the picked mushroom is imaged from the side. In this example the camera 22 is positioned by the blade 9 and it belongs to the machine vision system, which by means of the side image of the mushroom determines the point from which the stem of the mushroom is cut. The picking head 7 and the mechanisms related thereto take care of the transfers and positioning of the mushroom.

Figure 2:
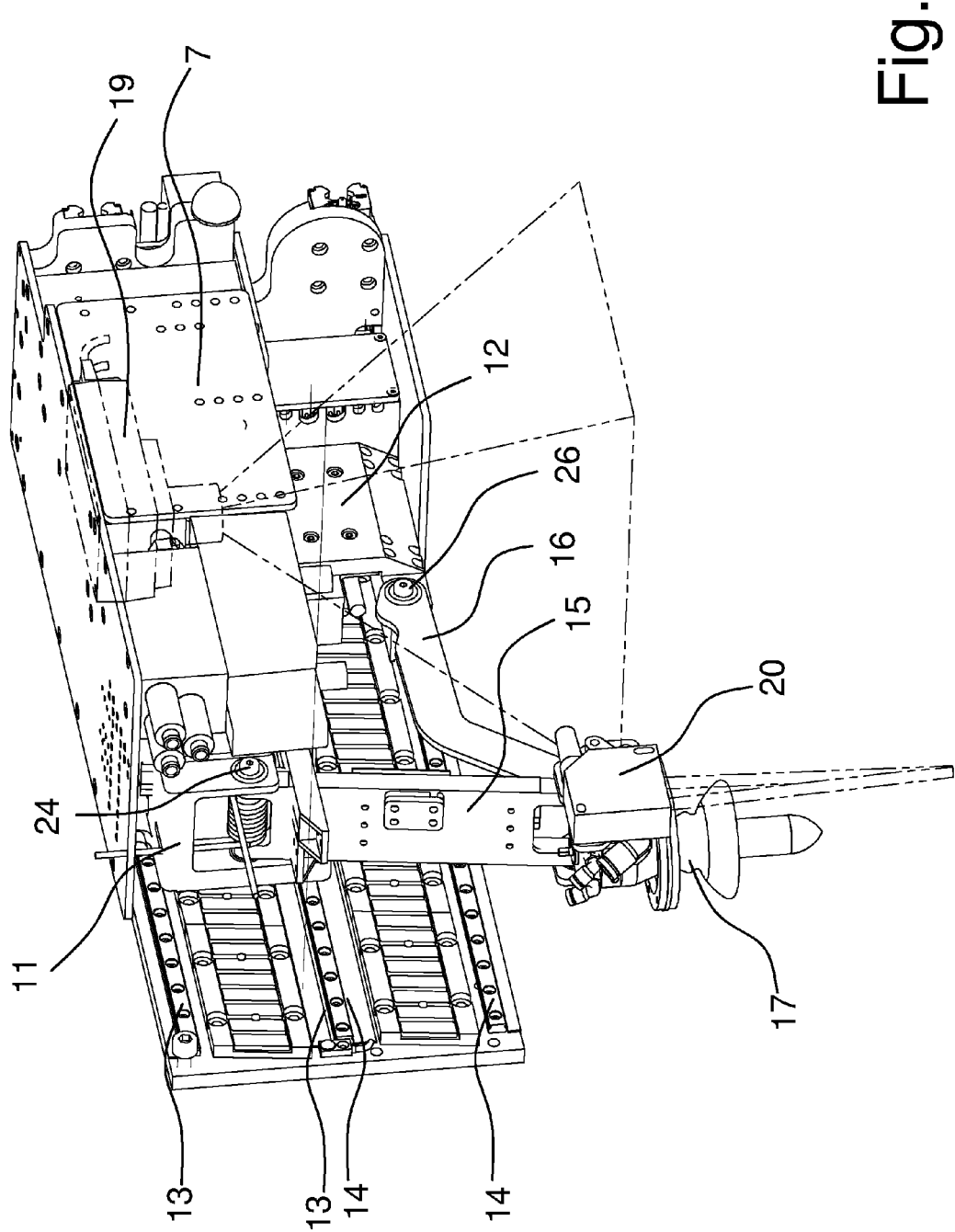
FIG. 2 shows a detail of the apparatus of FIG. 1 and its position in a first work stage.

FIG. 2 shows in more detail the picking head 7 positioned in the carriage 2 of FIG. 1. The picking head 7 is provided with a first linear servomotor 11 and a second linear servomotor 12 positioned on top of each other, said linear servomotors being arranged in parallel with the driving direction. The motors are also provided with a first linear guide 13 and a second linear guide 14, by means of which the fastening joints 24, 26 of a first lever 15 and a second lever 16 of the picking head 7 are moved horizontally back and forth and in relation to each other. The parts 11, 12, 13 and 14 are attached to the vertical wall of the picking head 7, which extends parallel to the driving direction of the carriage 2. The projecting picking head 7 is directed towards the back of the carriage 2. The first linear servomotor 11 and the structures belonging thereto constitute a moving first member to which the first lever 15 is attached. Correspondingly, the second linear servomotor 12 and the structures belonging thereto constitute a moving second member to which the second lever 16 is attached.

The rigid levers 15, 16 have a constant length and they are both attached from their outer end to a suction pad apparatus 17 by means of a fastening joint. When the linear servomotors 11, 12 move in relation to each other, the fastening joints 24, 26 of the levers 15, 16 also move in relation to each other, wherein the position between the levers 15, 16 determines the height on which the suction pad apparatus 17 is positioned. When the linear servomotors 11, 12 move in pace and in the same direction, the elevation of the suction pad apparatus 17 does not change, wherein a horizontal direct transfer is attained. The vertical direct transfer of the suction pad apparatus 17 is attained when the movements of the linear servomotors 11, 12 are synchronized in a suitable manner. Without the synchronized movements the suction pad apparatus 17 has a curved vertical motion.

It is possible to keep the suction pad apparatus 17 constantly in a vertical position and directed downward by means of a parallelogram mechanism formed by the first lever 15 and the control lever 18 coupled in parallel thereto (FIG. 3). The fastening joints of the lever 15 and the control lever 18 are located within a distance from each other and they are attached on one hand to the first member and on the other hand to the suction pad apparatus 17. The control lever 18 can also be a rod or an adjustment rod. Alternatively, the control lever 18 can be positioned next to the second lever 16. The purpose of the parallelogram mechanism is to maintain the position and orientation of the suction pad apparatus 17 independent of the height.

Alternatively, it is possible to replace the linear servomotor with an actuator which drives the member moving along the linear guide by means of a motor and a rotating screw. Alternatively, it is also possible to utilize a motor and a belt, wire or chain transmission to drive said member. Preferably linear servomotors are used, which are compact and in which position sensors can be easily integrated.

The second linear servomotor 12, i.e. the second member and the second linear guide 12 and the second lever 16 are not absolutely necessary, if the position of the parallelogram mechanism is guided by means of an actuator such as a motor that is attached to the fastening joint 24 of the first lever 15, or alternatively to the fastening joint 25 of the control lever 18 (FIG. 3), and turns the lever or control lever. Said actuator moves along with the first member.

In the embodiment of FIG. 2, the picking head 7 is also provided with a camera or scanner 19 of a machine vision system that images or scans the area in which mushrooms of varying size and length grow underneath the carriage 2. The camera/scanner 19 is attached to that point of the first member that provides an unobstructed view of the substrate. The camera/scanner 19 does not increase the length of the apparatus 1, and there is no risk that it would hit the picking head 7. The system typically comprises suitable lightning for the machine vision system, by means of which the mushrooms are illuminated for example from the side. The mushroom is accepted for picking if the diameter of the cap is sufficiently large. The actual location of the mushroom in the XYZ system of coordinates is determined by means of the machine vision system. The location of the carriage 2 and its different devices is also known, wherein the positioning of the devices for picking of mushrooms is possible.

In the embodiment of FIG. 2, the suction pad apparatus 17 is also provided with a measuring apparatus 20 that monitors the distance of the suction pad apparatus in relation to the mushroom to be picked. The measuring device 20 in question is for example a measuring device based on a laser beam, which is directed towards the cap of the mushroom from above. The Z coordinate of the actual location of the mushroom is determined by means of the measuring device 20. Information on the exact location of the mushroom facilitates the operation and makes the structure of the suction pad apparatus 17 simpler.

The measuring device 20 is not absolutely necessary, if the Z coordinate determined by the machine vision system is sufficiently accurate and reliable. The determination of the actual height of the mushroom is based for example on an image analysis, in which two images of the camera/scanner 19 are compared with each other, and the location of the mushroom is determined therefrom on the basis of calculation based on geometry. The camera/scanner 19 moves horizontally a predetermined distance between the images. When the measuring device 20 is attached to the suction pad apparatus 17 which remains vertically oriented as a result of the parallelogram mechanism, the measuring device 20 is always directed towards the mushroom to be picked for control purposes, and a separate measuring stage is not required. The measuring device 20 can also be positioned elsewhere in the carriage 2 or in the structure of the picking head 7.

In FIG. 2 the picking head 7 is in the picking position in which it has released a mushroom from the substrate. In FIG. 3, in turn, the picking head 7 is in a position in which the mushroom is being delivered into a box 23.

FIGS. 4a to 4d show a second embodiment of the apparatus according to the invention in principle, in which the camera/scanner 19 is also positioned in the same moving structure with the picking head 7, but separately from the first member (for example the first linear servomotor 11). The picking head 7 forms a T-shaped structure that moves on the support of one or several linear servomotors 5 and linear guides 6. The camera/scanner 19 is located in the front part of the carriage 2. The structure of the picking head 7 containing the suction pad 17 is directed backwards in the driving direction, and it also contains a box 23 for the mushrooms. In this embodiment the measuring device 20 is attached to the second member (for instance the second linear servomotor 12). The measuring device 20 is positioned above the picking area when the suction pad apparatus 17 is taking the mushroom 21 to be cut and into the box 23. Alternatively, the measuring device 20 can be attached to the first member.

FIGS. 4a to 4d illustrate in stages the movements of the first member (for example the first linear servomotor 11) and the second member (for example the second linear servomotor 12), said movements enabling the different movements of the suction pad apparatus 17 in picking, cutting and placing the mushroom 21 in the box 23, and in the measurement.

FIGS. 5a to 5d show a third embodiment of the apparatus 1 according to the invention, which is a modification of the embodiment shown in FIGS. 4a to 4d. The picking head 7 forms a moving structure of an I-shape, which is supported at its both ends by means of one or several linear servomotors 5 and linear guides 6. The suction pad apparatus 17 is located in the central part of the carriage 2. In this embodiment the measuring device 20 is attached to the first member (for example the first linear motor 11). The first linear guide 13 (and the first linear servomotor 11) and the second linear guide 14 (and the second linear servomotor 12) are positioned successively. The suction pad apparatus 17 is located between the first member and the second member.

FIGS. 5a to 5d illustrate in stages the movements of the first member (for example the first linear servomotor 11) and the second, member (for example the second linear servomotor 12), said movements enabling the different movements of the suction pad apparatus 17 in picking, cutting and placing the mushroom 21 in the box 23, and in the measurement.

Figure 4A:
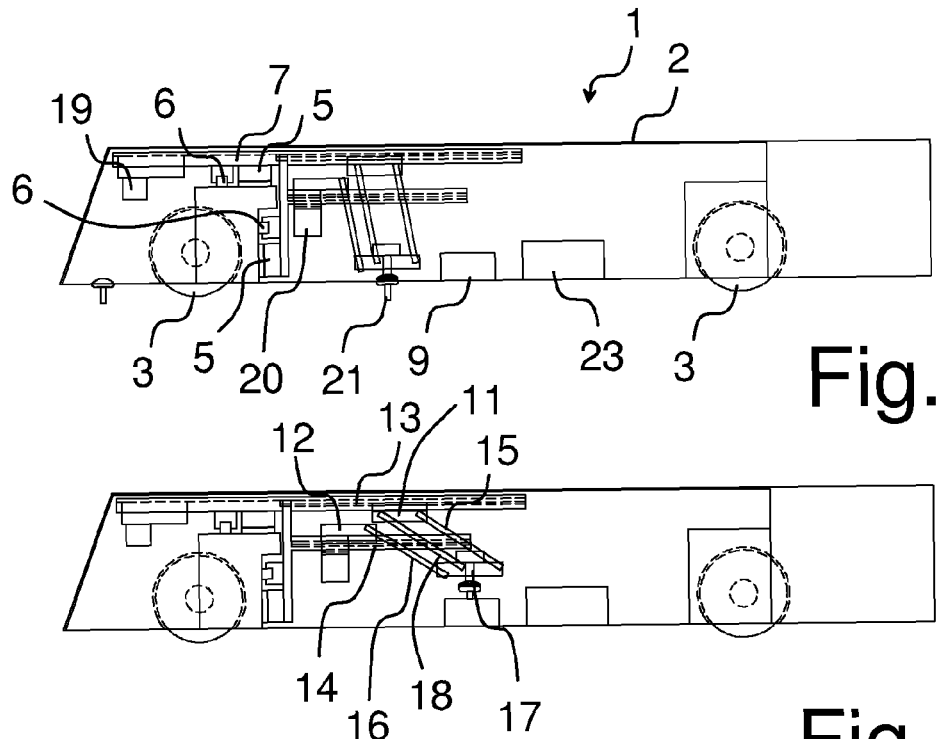
FIGS. 4a to 4d show the principle and mode of operation of a second embodiment of the invention in different work stages.
Figure 4B:
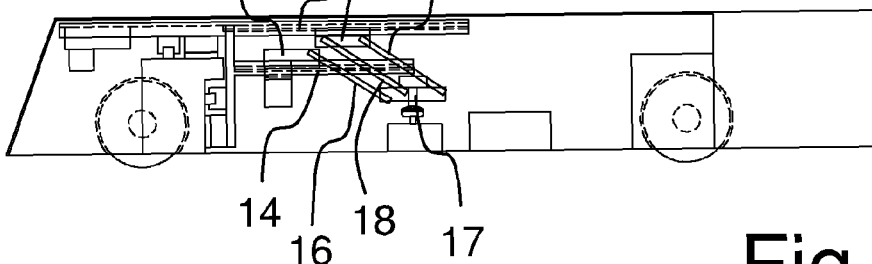
Figure 4C:
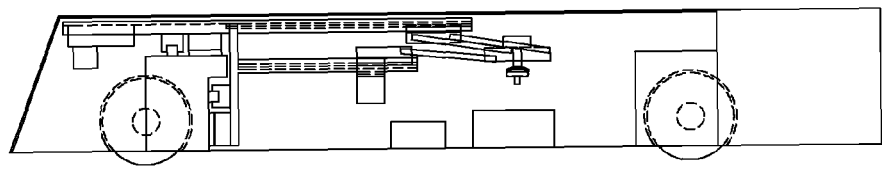
Figure 4D:
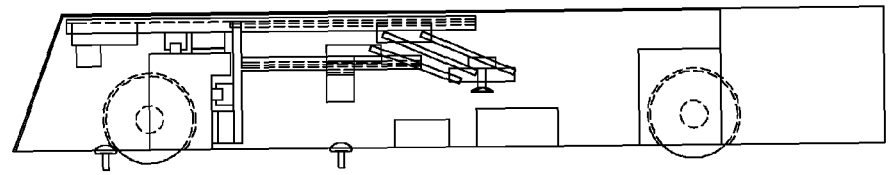
Figure 5A:
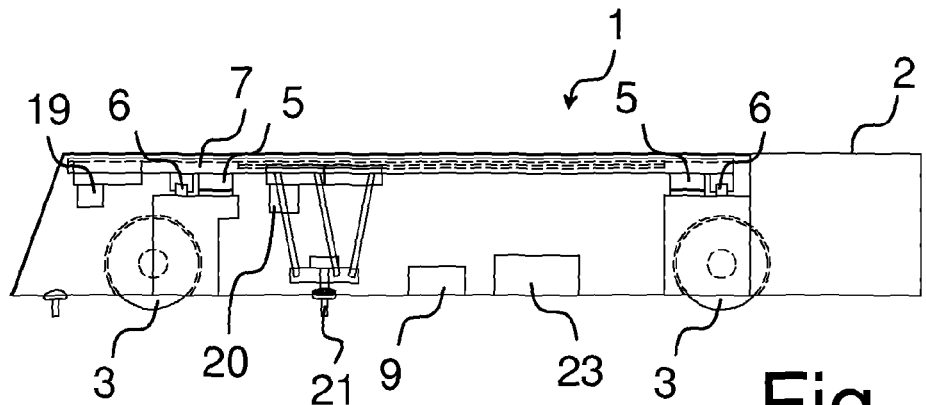
FIGS. 5a to 5d show the principle and mode of operation of a third embodiment of the invention in different work stages.
Figure 5B:
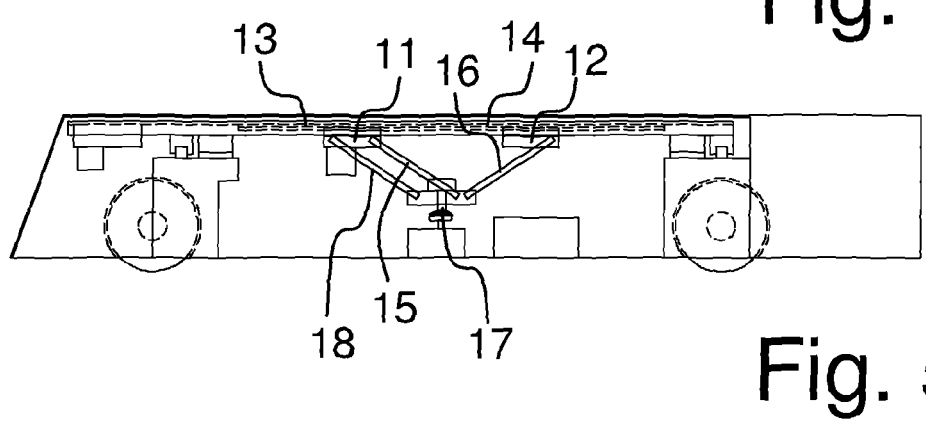
Figure 5C:
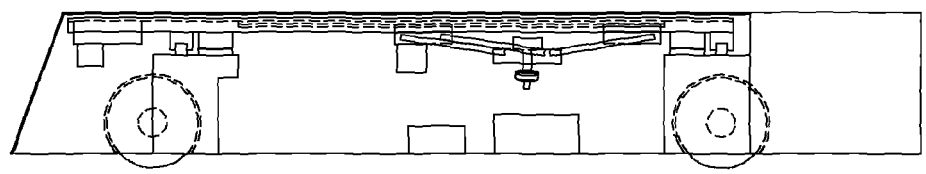
Figure 5D:
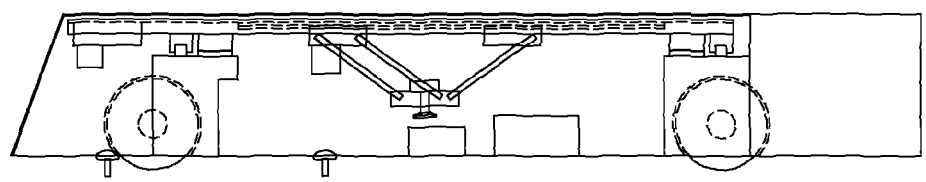

The camera/scanner shown in FIGS. 4a and 5a can be arranged movable separately for example by means of a linear motor 5 and a linear guide 6, separately from the picking head 7 and the structure moving therewith. The camera/scanner 19 moves preferably transversely with respect to the driving direction of the carriage 2, in parallel with the picking head 7.

The invention is not restricted solely to the embodiments and examples presented above, but it may vary in accordance with the appended claims.

The invention claimed is:

1. An apparatus for picking mushrooms, comprising:
   a carriage in which devices of the picking apparatus are placed;
   at least one picking head coupled to the carriage and arranged to move linearly back and forth in a horizontal direction in relation to the carriage when the carriage is positioned above an area in which the mushrooms grow;
   a suction pad apparatus configured to grip the mushrooms for picking, said suction pad apparatus being coupled to the at least one picking head; and
   a movable camera or scanner that is arranged to image said area in which the mushrooms grow;
   wherein the at least one picking head comprises a lifting and transfer mechanism configured to move the suction pad apparatus, the lifting and transfer mechanism comprising a first member arranged to move linearly back and forth in a horizontal direction and a second member arranged to move linearly back and forth in a horizontal direction, the first member and the second member being configured to move the suction pad apparatus in a horizontal direction, and wherein the suction pad apparatus is coupled by a first lever to the first member and by a second lever to the second member, the first lever and the second lever being configured to vertically move the suction pad apparatus.

2. The apparatus according to claim 1, wherein the camera or scanner and the at least one picking head are coupled to one moving structure.

3. The apparatus according to claim 1, wherein the suction pad apparatus is arranged to move linearly back and forth in a horizontal direction in relation to the at least one picking head, wherein a direction of movement of the suction pad apparatus is transverse in relation to a direction of movement of the at least one picking head.

4. The apparatus according to claim 1, wherein the picking apparatus further comprises:
   a machine vision system to which the camera or scanner is coupled, said machine vision system being arranged to identify the mushrooms to be picked and to determine an actual location of the mushrooms to be picked in an XYZ system of coordinates.

5. The apparatus according to claim 4, wherein the camera or scanner is arranged to image the mushroom to be picked at least from two different positions between which there is a certain distance, to determine an actual height of the mushroom to be picked in a Z system of coordinates, and to determine an actual diameter of a cap of a mushroom to be picked on a basis of the actual height.

6. The apparatus according to claim 1, further comprising:
   a measuring device arranged to determine or correct an actual height of the mushroom in a Z system of coordinates.

7. The apparatus according to claim 6, wherein the measuring device and the at least one picking head are coupled to one moving structure.

8. The apparatus according to claim 1, further comprising:
   a camera arranged to image the picked mushroom held by the suction pad apparatus from a side.

9. The apparatus according to claim 1, wherein the lifting and transfer mechanism further comprises:
   a controlled parallelogram mechanism configured to maintain an orientation of the suction pad apparatus irrespective of a height on which the suction pad apparatus is positioned.

10. The apparatus according to claim 1, wherein the first member and the second member are positioned either on top of each other or successively in a moving structure comprising the at least one picking head.

11. The apparatus according to claim 1, wherein the carriage is arranged to move back and forth in a multilevel shelf configured for growing mushrooms, and wherein the carriage can be transferred from one level to another.

12. An apparatus for picking mushrooms, comprising:
    a carriage in which devices of the picking apparatus are placed;
    at least one picking head coupled to the carriage and arranged to move linearly back and forth in a horizontal direction in relation to the carriage when the carriage is positioned above an area in which the mushrooms grow;
    a suction pad apparatus configured to grip the mushrooms for picking;
    a first member coupled to the at least one picking head and arranged to move linearly back and forth in a horizontal direction, the first member being configured to horizontally move the suction pad apparatus; and
    a controlled parallelogram mechanism for lifting and lowering the suction pad apparatus, the controlled parallelogram mechanism configured to couple the suction pad apparatus to the first member, and the controlled parallelogram mechanism being arranged to maintain an orientation of the suction pad apparatus irrespective of a height at which the suction apparatus is positioned.

13. The apparatus according to claim 12, further comprising:
    a second member coupled to the at least one picking head and arranged to move linearly back and forth in a horizontal direction and in parallel with the first member; and
    a lever for moving the parallelogram mechanism, the lever being configured to couple the second member to the suction pad apparatus and the parallelogram mechanism.

14. The apparatus according to claim 13, wherein the first member and the second member are positioned either on top of each other of successively in a moving structure comprising the picking head.

15. The apparatus according to claim 12, further comprising:
a movable camera or scanner that is arranged to image said area in which the mushrooms grow.

16. The apparatus according to claim 15, wherein the camera or scanner and the picking head are coupled to one moving structure.

17. The apparatus according to claim 12, wherein the suction pad apparatus is arranged to move linearly back and forth in a horizontal direction in relation to the picking head, wherein the direction of movement of the suction pad apparatus is transverse in relation to the direction of movement of the picking head.

18. The apparatus according to claim 12, further comprising:
a measuring device arranged to determine or correct the actual height of the mushroom to be picked in a Z system of coordinates.

19. The apparatus according to claim 18, wherein the measuring device and the picking head are coupled to one moving structure.

20. The apparatus according to claim 12, further comprising:
a camera arranged to image the picked mushroom held by the suction pad apparatus from the side.

21. The apparatus according to claim 12, wherein the carriage is arranged to move back and forth in a multilevel shelf intended for growing of mushrooms, and wherein the carriage can be transferred from one level to another.

* * * * *